July 3, 1956
S. REIS
2,753,025
MECHANISM FOR THE RELEASING OF THE CLUTCH AND THE
CHANGING OF GEARS IN AUTOMOBILE TRANSMISSIONS
Filed July 26, 1952
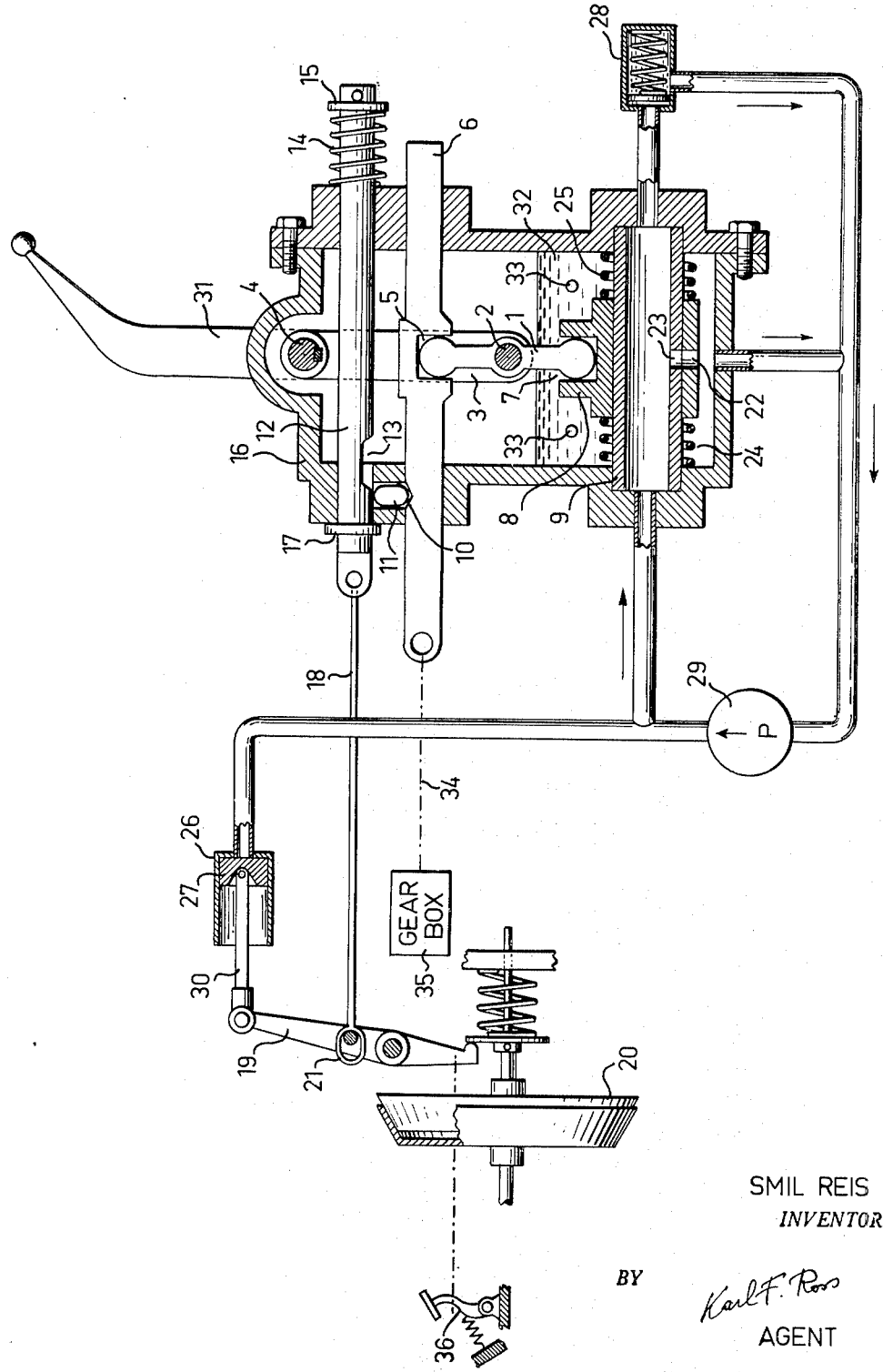
SMIL REIS
*INVENTOR.*
BY *Karl F. Ross*
AGENT United States Patent Office 2,753,025
Patented July 3, 1956

2,753,025

MECHANISM FOR THE RELEASING OF THE CLUTCH AND THE CHANGING OF GEARS IN AUTOMOBILE TRANSMISSIONS

Smil Reis, Milan, Italy

Application July 26, 1952, Serial No. 301,015

Claims priority, application Italy August 1, 1951

8 Claims. (Cl. 192—3.5)

This invention relates to a mechanism which is intended to be adapted to gear boxes connected with friction clutches in automobile transmissions, the said mechanism being suited for enabling to effect by a single operation the preliminary releasing of the clutch and the changing of the gears.

This invention provides a rocker arm lever which has a movable fulcrum, the said lever reacting on an element connected to the device which effects the changing of the gears, this device belonging to the gear box, and reacting on a second element which effects the closing of a valve, this valve being normally kept open, so as to prevent the normal flowing out of a fluid when the valve is closed, the said fluid being thus compelled to flow, through appropriate pipes, into a cylinder with a piston which effects the releasing of the friction clutch.

The invention further provides a locking device adapted to prevent the motion of the element connected to the gear changing device of the gear box while the clutch is engaged.

In this way, moving properly the fulcrum of the rocker arm lever by means of the gear changing control element to which it is connected, the valve through which the fluid flows out will be closed first, compelling the fluid to act on the piston which releases the friction clutch, and subsequently, the element connected to the gear changing device will be moved thus effectuating the gear change in the gear box.

An embodiment of this invention is diagrammatically shown in the drawing annexed to this description.

With reference to the drawing, 1 is a rocker arm lever whose fulcrum 2 is carried by the arm of a lever 3, pivoted at 4. The pivot 4 is supported in a fixed position, while the fulcrum 2 is movable with the arm of the lever 3.

The rocker arm lever 1 has one of its ends engaged in a slot 5 of a sliding rail 6. The opposite end of the rocker arm lever 1 is engaged in a slot 7 of a sleeve 8, this sleeve sliding on a cylinder 9 which is parallel to the rail 6.

The rail 6 is suitably connected to the gear changing device of the gear box. This rail has a second slot 10, in which engages an end of a pin 11 which is perpendicular to rail 6. The other end of the pin 11 abuts against a second sliding rail 12, which is parallel to rail 6. In its illustrated normal position, the rail 6 is locked, being prevented from camming the pin 11 out of the slot 10. In order to facilitate such camming action at the proper time, the pin 11 has its ends suitably rounded.

The rail 12 has a recess 13 which is normally kept at a little distance from the pin 11 by a spring 14. The spring 14 acts on a thrust washer 15, which is fastened to one end of the rail 12, and reacts on the housing 16 of the mechanism. The rail 12 has a stop 17 at the end opposite to washer 15. The stop 17 keeps the rail 12 against the same housing 16, on the side opposite to washer 15, determining at the same time the distance between the recess 13 and the pin 11.

The rail 12 is connected by means of a link 18, or equivalent means, to the lever 19 which is employed for releasing the clutch 20. The link 18 has an elongated hole 21 through which it is connected to the lever 19, this connection representing a lost-motion coupling enabling lever 19 to effect the releasing of the clutch before it will shift the rail 12.

The sleeve 8 and the cylinder 9 have respectively the openings 22 and 23, cut in their walls in central position. On both sides of the sleeve 8 are two equal springs 24 and 25 which maintain the sleeve 8 in central position so that its opening 22 is aligned with the opening 23 of cylinder 9. In this position, a fluid put under pressure inside the cylinder 9 will flow freely out. Upon a displacement of the sleeve 8 to the right or left, as viewed in the drawings, the openings 22 and 23 will be disaligned and the fluid inside the cylinder 9 will be prevented from escaping. Suitable stops 33 serve to limit the travel of the sleeve 8 and thus of the opposite end of the rocker arm lever 1.

A cylinder 26 with a piston 27, a relief valve 28 and a pump 29 are connected by means of appropriate pipes to the cylinder 9. The piston 27 is connected by means of a push rod 30, or equivalent means, to the lever 19.

A lever 31 is fastened to the lever 3, so that both must swing solidly. The lever 31 is linked to the gear changing control element of the transmission schematically indicated at 34. The fluid 32, which is circulated in the mechanism by the pump 29, can be contained inside the housing 16 or in a separate container.

The mechanism works as follows.

At the start of a gear change, the friction clutch 20 is engaged, the rail 12 is urged by the spring 14 to the right, as viewed in the drawing, and the pin 11 is engaged in the slot 10, thus locking the rail 6 in central position. The sleeve 8 is also maintained in central position by the springs 24 and 25. The openings 22 and 23 are aligned and the fluid arriving from the pump 29 flows out of the cylinder 9.

Upon a shifting of lever 31 toward, for instance, the right as viewed in the drawing, the lever 3 and the fulcrum 2 will move to the left. The rocker arm 1, pivoting around its fulcrum 2, exerts pressure with one end on the rail 6 which is locked in its position by the pin 11. The opposite end of the rocker arm 1, acting on the sleeve 8 shifts this sleeve also to the left, as viewed in the drawing. In this way, the openings 22 and 23 are closed and at the same time the spring 24 is compressed more than spring 25. The fluid arriving from the pump 29, finding its normal path of circulation blocked, is thus driven through the appropriate conduits into the cylinder 26, acting on the piston 27 which in turn acts on the lever 19, thus releasing the friction clutch 20. Subsequently, after having gone over the whole length of the elongated hole 21, the lever 19 shifts, by means of the link 18, the rail 12, until the recess 13 is aligned with the pin 11. The latter can thus be cammed out of the slot 10 into the recess 13, allowing the rail 6 to be shifted to the left, as viewed in the drawing, and to act on the gear changing device of the gear box 35 so as to bring the proper gears into engagement. At this point, upon releasing the lever 31, the rail 6 remains in the position which it has reached, held firm by the retaining means which are in a well known manner incorporated in the gear box, and (following the release of lever 31 by the operator) the spring 24 brings the sleeve 8 back to its central position, re-opening the openings 22 and 23 and returning the lever 31 slightly to the left by means of members 1 and 3. In this position, the fluid circulated by the pump 29 flows again freely out and the clutch 20 is re-engaged by action of its own springs, as is well known.

At this stage, the pin 11 is engaged in the recess 13 and abuts against the rail 6, which is therefore free to move back, when lever 31 is moved again in the opposite sense, for disengaging the gears. Upon the return of lever 31 to its central position, which it occupied at the start of the gear change, the rail 6 will return readily to its central position, by action of the rocker arm 1 which bears on the sleeve 8 and on the springs 24 and 25. The rail 6 acts on the gear changing device of the gear box in the opposite sense, disengaging the gears without first necessarily disengaging the friction clutch 20. As the slot 10 again registers with the pin 11, the spring 14 can restore the rail 12 to its initial position, thereby locking the rail 6. In this manner, upon reoperation of lever 31 for another gear change, the clutch 20 will be released preliminarily, as already described.

The relief valve 28 is designed to go into action in response to excess pressure to enable the fluid driven by the pump 29 to flow out when this is otherwise prevented.

The combination of the sleeve 8 and the cylinder 9 form in fact an intercepting valve and can be replaced by a valve, operated through electromagnetic devices, without altering the substance of this invention. Further, this invention may be integrated by a connection between the lever 19 and the control element 36 of the engine throttle, so that the speed of the engine may be reduced while the clutch is released.

I claim:

1. A mechanism for the releasing of the clutch and the changing of gears in automobile transmissions, comprising: a movable member in operative connection with the control element of the transmission; a rocker arm lever pivotally mounted on said movable member; a slidable member in operative connection with one end of the rocker arm lever and with the gear changing device of the transmission; a locking device and a resilient element in co-action therewith for retaining said slidable member and said connected end of the rocker arm lever in central position whereby the opposite end of said rocker arm lever is moved when said movable member is moved; an intercepting valve for the outflow of an operative fluid, in operative connection with said opposite end of the rocker arm lever; springs tending to keep said valve open; stops for limiting the travel of said opposite end of said rocker arm lever after said intercepting valve has been closed; a cylinder with a piston therein, actuated by the operative fluid; a lost motion connection between said piston and said locking device; an operative connection between said piston and an element for releasing the clutch; means for driving the operative fluid and means for directing said fluid into said cylinder and at the same time into said intercepting valve.

2. A mechanism according to claim 1, wherein said intercepting valve comprises a hollow cylindrical body having a lateral opening and a sleeve slidable on said body and provided with a lateral opening, said springs acting between said sleeve and the housing of the mechanism for keeping said lateral openings of said sleeve and said cylindrical body aligned.

3. In an automotive transmission having selectively engageable gears controlled by an actuating element and a clutch provided with a control element and with resilient means tending to maintain the clutch engaged, in combination, a movable member operatively connected to said actuating element, detent means normally locking said movable member in a neutral position, manually operable shift means, pivot means on said shift means, rocker means fulcrumed on said pivot means, a source of motive power adapted to displaced said control element against the force of said resilient means into a clutch-disengaging position, check means normally maintaining said source ineffective to displace said control element, said rocker means being operatively linked to said movable member and to said check means at locations spaced from each other and from said pivot means whereby manual displacement of said shift means in the locked condition of said movable member oscillates said rocker means in a manner moving said check means into an off-normal position, thereby enabling said power source to actuate said control element for releasing the clutch, a lost-motion connection between said control element and said detent means for inactivating the latter in response to continued displacement of said control element by said source, thereby unlocking said movable member for movement into a gear-engaging position in response to continued manual pressure exerted upon said shift means, and restoring means effective upon release of said manually operable shift means for returning said check means to normal and again inactivating said source, thereby enabling said resilient means to re-engage said clutch.

4. The combination according to claim 3, wherein said movable member is provided with a camming formation, said detent means comprising a latch element movable by said formation in a direction substantially perpendicular to the path of said movable member and a blocking member normally obstructing such movement by said latch element, thereby preventing a movement of said camming formation past said latch element, said blocking member being engaged by said lost-motion connection.

5. The combination according to claim 3, wherein said source of motive power comprises conduit means containing a motive fluid and continuously operative pump means for placing said fluid under pressure, said conduit means extending toward said control element, said check means including other conduit means forming a bypass for the circulation of said fluid through said pump means and valve means for selectively closing said bypass.

6. The combination according to claim 5, wherein said valve means comprises a cylinder forming part of said other conduit means and a sleeve slidably surrounding said cylinder, said cylinder and said sleeve being provided with lateral openings aligned in a normal relative position thereof and included in said bypass, said restoring means comprising spring means anchored to both said cylinder and said sleeve for maintaining same in said normal relative position.

7. The combination according to claim 5, including additional conduit means forming a further bypass for said fluid and safety valve means in said further bypass for relieving excess fluid pressure in the blocked condition of the first bypass.

8. The combination according to claim 3, wherein said shift means comprises a lever, said rocker means comprising an arm pivoted at an intermediate location to an extremity of said lever and having opposite ends in engagement with said movable member and with said check means, respectively.

References Cited in the file of this patent

UNITED STATES PATENTS

| 1,966,865 | Linsley | July 17, 1934 |
| 1,972,446 | Jander | Sept. 4, 1934 |
| 2,104,061 | Surdy | Jan. 4, 1938 |
| 2,263,047 | Newton | Nov. 18, 1941 |
| 2,328,092 | Nutt | Aug. 31, 1943 |